US009221475B2

(12) United States Patent
Voisine

(10) Patent No.: US 9,221,475 B2
(45) Date of Patent: Dec. 29, 2015

(54) SELF LUBRICATED SPHERICAL TRANSOM BEARING

(71) Applicant: ROLLER BEARING COMPANY OF AMERICA, INC., Oxford, CT (US)

(72) Inventor: James Voisine, Burlington, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 235 days.

(21) Appl. No.: 13/939,736

(22) Filed: Jul. 11, 2013

(65) Prior Publication Data

US 2014/0158016 A1 Jun. 12, 2014

Related U.S. Application Data

(60) Provisional application No. 61/670,242, filed on Jul. 11, 2012.

(51) Int. Cl.
| | | |
|---|---|---|
| *B61F 99/00* | (2006.01) | |
| *B61F 5/52* | (2006.01) | |
| *F16C 23/04* | (2006.01) | |

(52) U.S. Cl.
CPC . *B61F 99/00* (2013.01); *B61F 5/52* (2013.01); *F16C 23/045* (2013.01)

(58) Field of Classification Search
CPC .... F16C 23/043; F16C 23/045; F16C 23/046; B61F 5/06; B61F 5/52; B61F 99/00
USPC ...................................... 105/194, 199.1, 209
See application file for complete search history.

(56) References Cited

U.S. PATENT DOCUMENTS

| | | | | |
|---|---|---|---|---|
| 3,313,245 | A | * 4/1967 | Sundby | ..................... 105/198.7 |
| 3,461,814 | A | 8/1969 | Weber et al. | |
| 3,557,709 | A | 1/1971 | Ornskoldsvik et al. | |
| 3,661,097 | A | 5/1972 | Jackson | |
| 3,795,203 | A | * 3/1974 | Sundby | ..................... 105/182.1 |
| 3,817,188 | A | 6/1974 | Lich | |
| 3,874,050 | A | * 4/1975 | White | ..................... 29/898.047 |
| 3,912,343 | A | 10/1975 | Paton et al. | |
| 3,924,540 | A | 12/1975 | Podgajny | |
| 4,003,316 | A | 1/1977 | Monselle | |
| 4,030,424 | A | * 6/1977 | Garner et al. | .............. 105/182.1 |
| 4,150,627 | A | 4/1979 | Paton et al. | |
| 4,242,966 | A | 1/1981 | Holt et al. | |

(Continued)

FOREIGN PATENT DOCUMENTS

| | | |
|---|---|---|
| CA | 2064441 C | 6/1997 |
| GB | 1509431 | 4/1978 |

(Continued)

*Primary Examiner* — Zachary Kuhfuss
(74) *Attorney, Agent, or Firm* — MKG, LLC

(57) ABSTRACT

A suspension system for a rail car has at least two undercarriage members and at least one equalizer bar removably and pivotally secured to and between the two undercarriage members. A spherical bearing has an outer member that surrounds an inner member. The outer member is removably secured to one of the undercarriage members. The inner member is removably secured to the equalizer bar. The outer member defines at least one outer member section having an arcuate interior surface and the inner member defines at least one inner member section having an arcuate exterior surface. A low friction liner is disposed on at least one of the arcuate interior surface or the arcuate exterior surface.

26 Claims, 4 Drawing Sheets

(56) References Cited

U.S. PATENT DOCUMENTS

| | | | |
|---|---|---|---|
| 4,244,297 A | 1/1981 | Monselle | |
| 4,386,869 A * | 6/1983 | Smith | 403/39 |
| 4,398,468 A | 8/1983 | Bell et al. | |
| 4,553,760 A | 11/1985 | Reed et al. | |
| 4,742,780 A | 5/1988 | Waddington | |
| 5,027,716 A * | 7/1991 | Weber et al. | 105/187 |
| 5,072,673 A | 12/1991 | Lienard | |
| 5,222,441 A | 6/1993 | Weber | |
| 5,288,354 A | 2/1994 | Harris et al. | |
| 5,463,964 A | 11/1995 | Long et al. | |
| 5,833,171 A | 11/1998 | Harris | |
| 6,209,206 B1 * | 4/2001 | Harris et al. | 29/898.043 |
| 6,389,985 B1 | 5/2002 | Trent | |
| 6,672,224 B2 | 1/2004 | Weber et al. | |
| 7,631,603 B2 | 12/2009 | Forbes et al. | |
| 7,823,513 B2 | 11/2010 | Forbes et al. | |
| 7,845,288 B2 | 12/2010 | Forbes et al. | |
| 7,946,229 B2 | 5/2011 | Forbes et al. | |
| 8,113,126 B2 | 2/2012 | Forbes et al. | |
| 8,272,333 B2 | 9/2012 | Forbes et al. | |
| 2005/0242053 A1 | 11/2005 | Brabb et al. | |
| 2006/0131083 A1 * | 6/2006 | Matthys et al. | 180/9.5 |
| 2007/0151775 A1 * | 7/2007 | Bedford et al. | 180/9.5 |
| 2008/0157496 A1 * | 7/2008 | Lefferts et al. | 280/124.1 |
| 2012/0318166 A1 | 12/2012 | Wike | |
| 2013/0033013 A1 * | 2/2013 | Voisine | 280/28.5 |
| 2014/0166376 A1 * | 6/2014 | Maier et al. | 180/9.5 |

FOREIGN PATENT DOCUMENTS

| | | |
|---|---|---|
| JP | 2002302038 A | 10/2002 |
| WO | 2005025961 A1 | 3/2005 |

* cited by examiner

SELF LUBRICATED SPHERICAL TRANSOM BEARING

CROSS REFERENCE TO RELATED APPLICATIONS

This application claims the benefit of U.S. Provisional Patent Application No. 61/670,242, filed on Jul. 11, 2012, the contents of which are incorporated herein by reference in their entirety.

FIELD

The disclosed subject matter is generally directed to a self lubricated spherical transom bearing and more particularly to a spherical bearing having a low friction liner for use in a transom joint of a suspension system for a rail car.

BACKGROUND

Rail cars such as passenger, freight, flat, tanker, box and cargo cars are designed to carry heavy loads at high speeds along a rail system. Each of the rail cars typically includes a housing dampingly mounted on a frame structure. For example, a set of springs and shock absorbers can be coupled between the housing and the frame structure to dampen vibration of the rail car and to reduce dynamic loads on rails on which the rail cars travel. A plurality of wheels rotatably mounted on axles is typically coupled to a portion of the frame structure. The frame structure can be subject to oscillatory loads including force vectors and moments as a result of movement of the rail car along the rails. The oscillatory loads can cause wear and premature failure of the frame or portions thereof.

SUMMARY

In one aspect, the present invention resides in a suspension system for a rail car comprising: at least two undercarriage members; at least one equalizer bar removably and pivotally secured to and between the two undercarriage members; a spherical bearing having an outer member surrounding an inner member; the outer member being removably secured to one of the at least one undercarriage members, the outer member defining at least one outer member section having an arcuate interior surface; the inner member being removably secured to the at least one equalizer bar, the inner member defining at least one inner member section having an arcuate exterior surface; and a low friction liner disposed on at least a portion of one of the arcuate interior surface and the arcuate exterior surface.

In another aspect, the present invention resides in a suspension system for a rail car comprising: a first undercarriage member; a second undercarriage member; a first equalizer bar having a first end secured to a portion of the first undercarriage member, and a second end removably and pivotally secured to the second undercarriage member at a first transom joint; a second equalizer bar having a first end secured to a portion of the second undercarriage member, and a second end removably and pivotally secured to the first undercarriage member at a second transom joint; a first spherical bearing disposed in the first transom joint, the first spherical bearing having a first outer member surrounding a first inner member, the first outer member being removably secured to the second undercarriage member and defining at least one first outer member section having a first arcuate interior surface, the first inner member being removably secured to the first equalizer bar and defining at least one first inner member section having a first arcuate exterior surface; a second spherical bearing disposed in the second transom joint, the second spherical bearing having a second outer member surrounding a second inner member, the second outer member being removably secured to the first undercarriage member and defining at least one second outer member section having a second arcuate interior surface, the second inner member being removably secured to the second equalizer bar and defining at least one second inner member section having a second arcuate exterior surface; a first low friction liner disposed on at least a portion of one of the first arcuate interior surface and the first arcuate exterior surface; and a second low friction liner disposed on at least a portion of one of the second arcuate interior surface and the first arcuate exterior surface.

DETAILED DESCRIPTION

Figure 1:
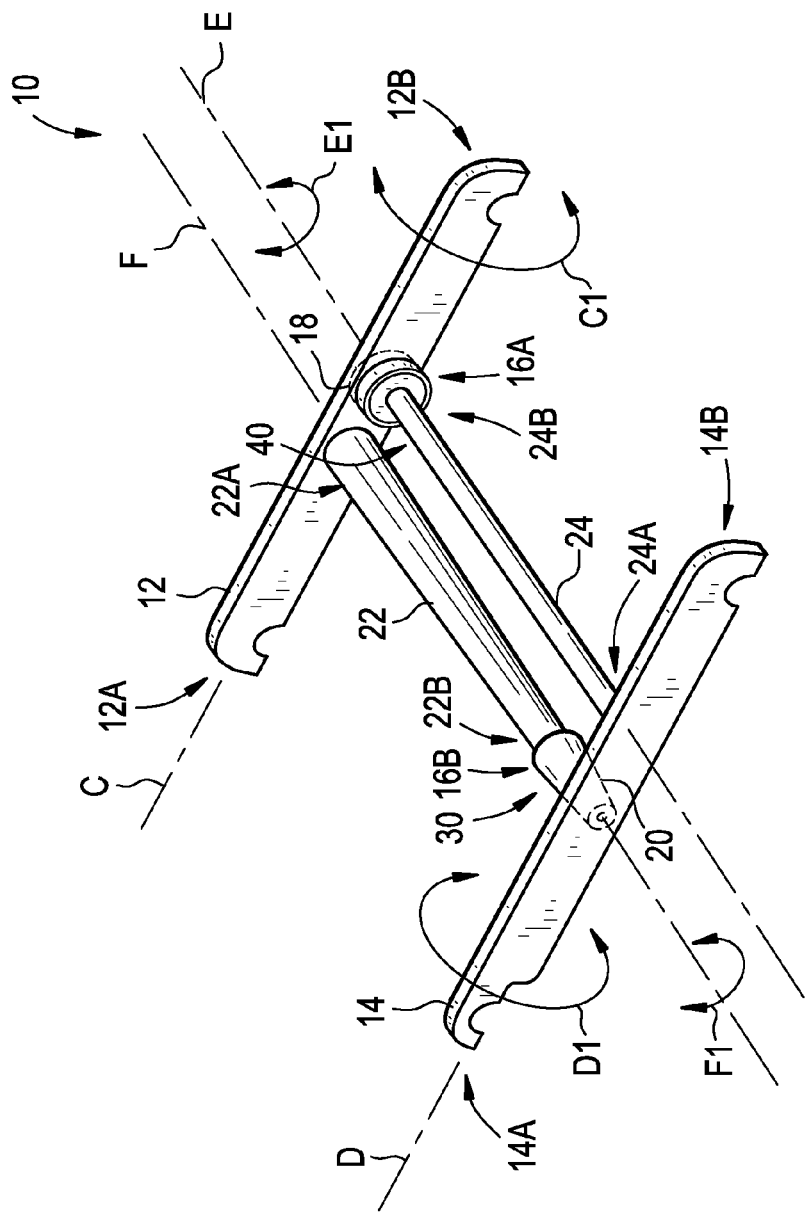
FIG. 1 is a perspective view of a suspension system for a rail car including spherical bearings of the present invention.
Figure 2:
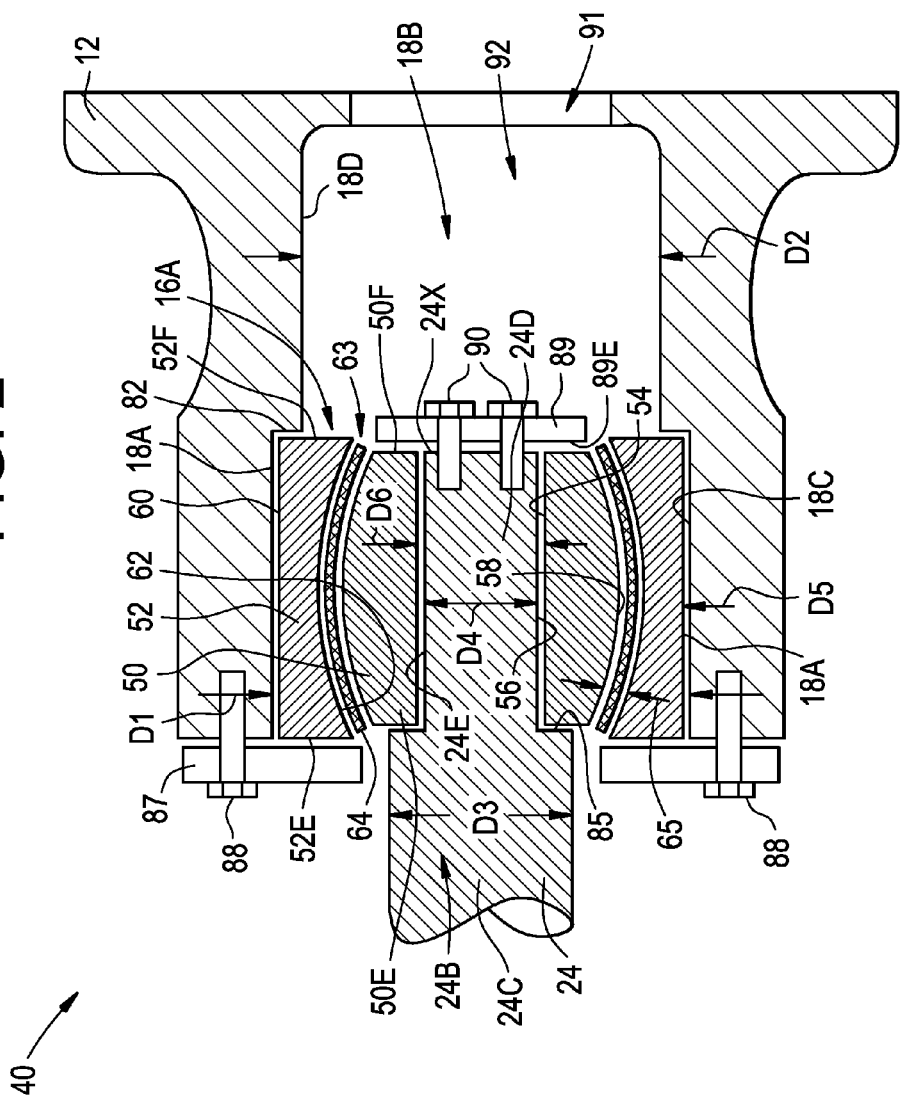
FIG. 2 is an enlarged view of a portion of the suspension system for a rail car of FIG. 1 showing details of the spherical bearing.

As illustrated in FIGS. 1 and 2, a suspension system for a rail car is generally designated by the numeral 10. The suspension system 10 includes at least two undercarriage members, for example a first undercarriage member 12 and a second undercarriage member 14. The first and second undercarriage members 12 and 14 are dampenly coupled to a rail car housing (not shown) by one or more spring and damper systems (not shown). The first and second undercarriage members 12 and 14 support an axle and wheel assembly (not shown). The first and second undercarriage members 12 and 14 are aligned along substantially parallel axes C and D, respectively. The first undercarriage member 12 includes a spherical bearing 16A disposed in a bore 18 of the undercarriage member 12. The second undercarriage member 14 includes a spherical bearing 16B disposed in a bore 20 defined by an interior surface of the second undercarriage members 14. The spherical bearings 16A and 16B are configured similar to one another. The bore 18 is positioned between opposing ends 12A and 12B of the first undercarriage member 12. The bore 20 is positioned between opposing ends 14A and 14B of the second undercarriage member 14.

As illustrated in FIG. 1, suspension system 10 includes at least one equalizer bar removably and pivotally secured to and between the two undercarriage members 12 and 14. In the illustrated embodiment, the first undercarriage member 12 includes a first equalizer bar 22 having a first end 22A secured to a portion of the undercarriage member 12, by suitable fasteners or other known means (not shown); and the second undercarriage member 14 includes a second equalizer bar 24 having a first end 24A secured to a portion of the undercarriage member 14, by suitable fasteners or other known means (not shown). A second end 22B of the first equalizer bar 22 is coupled to a portion of the spherical bearing 16B as described below and thereby is removably and pivotally secured to the second undercarriage member 14. A second end 24B of the second equalizer bar 24 is removably coupled to a portion of the spherical bearing 16A as described below and thereby is removably and pivotally secured to the first undercarriage member 12. The first equalizer bar 22 defines an axis of rotation F; and the second equalizer bar 24 defines an axis of rotation E. The spherical bearing 16B and the equalizer bar 22 cooperate with one another to define a transom joint 30 which pivotally couples the first undercarriage member 12 to the second under carriage member 14. The spherical bearing 16A and the equalizer bar 24 cooperate with one another to define a transom joint 40 which pivotally couples the first undercarriage member 12 to the second under carriage member 14. For example, the undercarriage members 12 and 14 are pivotally coupled to one another by the transom joints 30 and 40 for rotation relative to the axes C, D, E and F as indicated by the arrows C1, D1, E1 and F1, respectively.

As illustrated in FIG. 2, the spherical bearing 16A has an inner member 50 encircled at least partially by an outer member 52. The inner member 50 includes an interior surface 54, such as but not limited to a substantially cylindrical surface, that defines a bore 56 extending through the inner member 50. The inner member 50 has an arcuate exterior surface 58, such as a convex spherical surface. The outer member 52 has a substantially cylindrical exterior surface 60 and an arcuate interior surface 62, such as but not limited to a concave spherical surface which defines an interior area 63 of the outer member. The inner member 50 is disposed in the interior area 63 thereby forming a gap 65 between the exterior surface 58 and the interior surface 62. The transom joint 40 is defined by the outer member 52 of spherical bearing 16A being removably secured to the undercarriage member 12 and the inner member 50 of spherical bearing 16A being removably secured to the equalizer bar 24. Similarly, the transom joint 30 is defined by the outer member 52 of spherical bearing 16B being removably secured to the undercarriage member 14 and the inner member 50 of spherical bearing 16B being removably secured to the equalizer bar 22.

Figure 3:
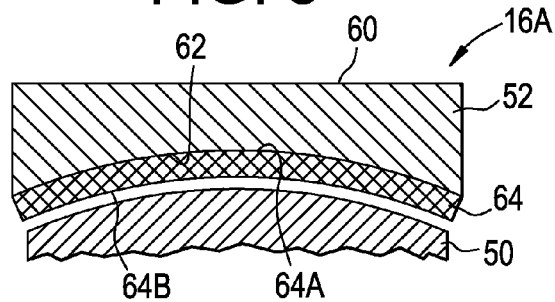
FIG. 3 is an enlarged cross sectional view of a portion of the spherical bearing of FIGS. 1 and 2.

As illustrated in FIGS. 2 and 3, a low friction liner 64 is secured to the interior surface 62 of the outer member 52. The low friction liner 64 is manufactured with a self-lubricating material, which allows lubricious properties of the low friction liner 64 to be maintained without addition of a lubricating agent such as oil or grease. In one embodiment, low friction liner 64 defines a bonding surface 64A that is secured to the interior surface 62 by bonding using temperature and pressure. One example of bonding is an adhesive bonding process. The low friction liner 64 also defines a second surface 64B, opposite the bonding surface 64A, which slidingly engages the exterior surface 58 of the inner member 50.

Figure 5:
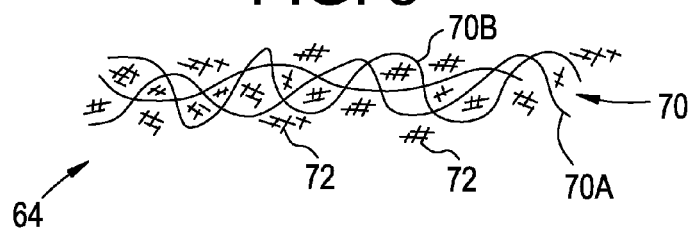
FIG. 5 is an enlarged cross sectional schematic illustration of a woven low friction liner.

The low fiction liner 64 is manufactured from a material having low friction characteristics or qualities. In one embodiment, as shown for example in FIG. 5, the low friction liner 64 is a woven fabric 70. The woven fabric 70 includes a plurality of fibers 70A and 70B interwoven with one another and polytetrafluoroethylene (PTFE) 72 interwoven therewith. The fibers 70A and 70B include, for example, a polyester material, a stainless steel material and/or glass material. The fibers 70A and 70B interwoven with the PTFE 72 enhance bondability of liner 64 to the interior surface 62 of the outer member 52. In one example, the low friction liner 64 is manufactured from Fabroid®, in particular Fabroid IIG2, which is commercially available from RBC Bearings, Oxford, Conn., United States. In another embodiment, the liner 64 is manufactured from Fiberglide, which is also commercially available from RBC Bearings. The low friction liner 64 has properties and characteristics sufficient to withstand high loads with insignificant wear. Thus, spherical bearings 16A and 16B having the low friction liner 64 mounted therein are operational for extended life when compared to prior art bearings. In one embodiment, the low friction liner 64 has a dynamic capacity of 30,000 pounds per square inch (psi) so that the spherical bearings 16A and 16B can withstand high loads (e.g., high dynamic loads) and vibrations without damaging the low friction liner 64. In one embodiment, the low friction liner 64 has a dynamic capacity of 25,000 psi to 35,000 psi. In one embodiment, the low friction liner 64 has a dynamic capacity of 28,000 psi to 32,000 psi. In one embodiment, the low friction liner 64 has a dynamic capacity of at least 30,000 psi or greater. The low friction liner 64 provides constant lubrication or lubrication on demand which addresses the limitations of grease lubrication for the high frequency, small oscillations that are exhibited as a result of movement of the rail car housing along rails. The low friction liner 64 will help resist adhesive wear/fretting corrosion that results from these conditions. The low friction liner 64 will also reduce costly maintenance programs and rail car downtime.

Figure 4:
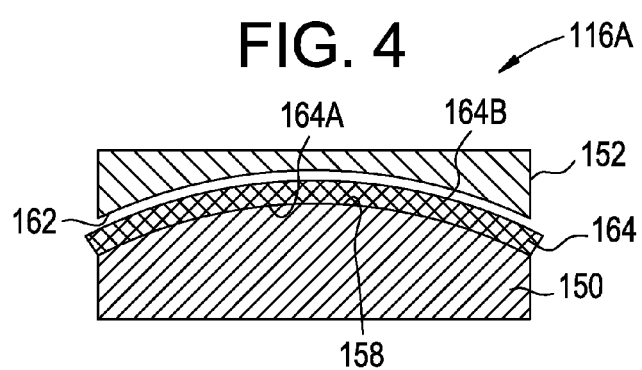
FIG. 4 is an enlarged cross sectional view of a portion of the spherical bearing in accordance with one embodiment of the present invention.

While the bonding surface 64A of the low friction liner 64 is shown and described as being secured to the interior surface 62 of the outer member 52, the present invention is not limited in this regard. In one embodiment, for example spherical bearing 116A shown in FIG. 4, a low friction liner 164 is secured to an exterior surface 158 of an inner member 150. Low friction liner 164 defines a bonding surface 164A that is secured to the exterior surface 158 by bonding using temperature and pressure as described above with reference to securing bonding surface 64A to the interior surface 62 of the outer member 52 of spherical bearing 16A. The low friction liner 164 also defines a second surface 164B, opposite the bonding surface 164A, which slidingly engages an interior surface 162 of the outer member 152.

Figure 6:
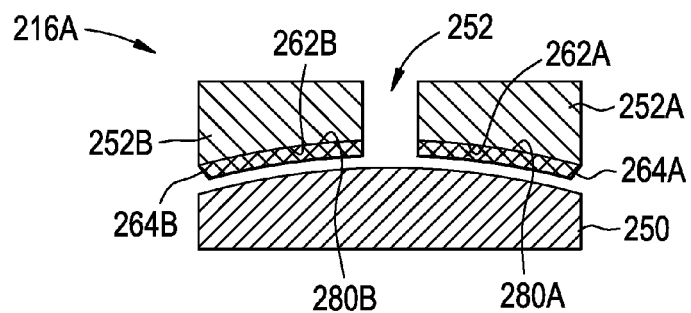
FIG. 6 is an enlarged cross sectional view of a portion of a spherical bearing having a radially split outer member.

The bearing 216A illustrated in FIG. 6 is similar to the bearings 16A and 16B shown in FIGS. 1-3, thus like elements are given like element numbers preceded by the numeral 2. A spherical bearing 216A includes an inner member 250 and an outer member 252 that is radially split into an outer member first section 252A and an outer member second section 252B. While the outer member 252 is shown and described as having two outer member sections 252A and 252B, the present invention is not limited in this regard as the outer member 252 may comprise more than two portions without departing from the broader aspects of the invention. A low friction liner 264A includes a bonding surface 280A that is secured to an interior surface 262A of the outer member first section 252A; and a low friction liner 264B includes a bonding surface 280B that is secured to an interior surface 262B of the outer member second section 252B. Radially splitting the spherical bearing 216A into the outer member first section 252A and the outer member second section 252B facilitates installation of the bearing 216A into the bores 18 and 20.

Figure 7:
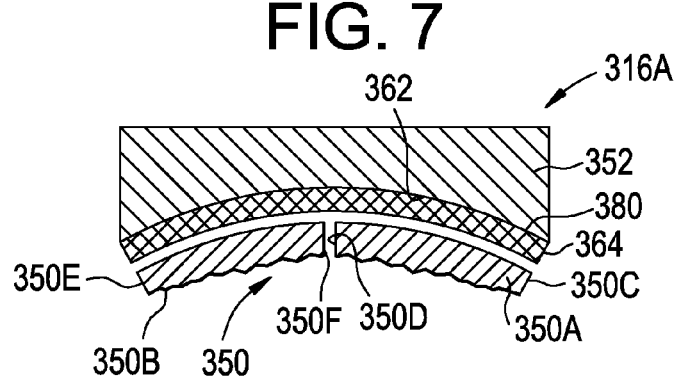
FIG. 7 is an enlarged cross sectional view of a portion of a spherical bearing having a radially split inner member.
Figure 8:
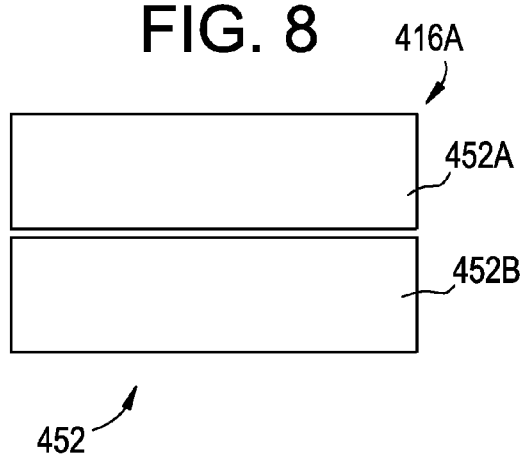
FIG. 8 is an enlarged view of a portion of a spherical bearing having an axially split outer member.

The bearing 316A illustrated in FIG. 7 is similar to the bearings 16A and 16B shown in FIGS. 1-3, thus like elements are given like element numbers preceded by the numeral 3. A spherical bearing 316A includes an outer member 352 and an inner member 350 that is radially split into an inner member first section 350A and an inner member second section 350B. A low friction liner 364 includes a bonding surface 380 that is secured to an interior surface 362 of the outer member 352. While the low friction liner 364 is shown and described as being secured to the interior surface 362 of the outer member 352, the present invention is not limited in this regard as a first section of the low friction liner 364 can define a bonding surface that is secured inner member first section 350A, and a second section of the low friction liner 364 can define a bonding surface that is secured inner member second section 350B. Radially splitting the spherical bearing 316A into the inner member first section 350A and the inner member second section 350B facilitates installation of the bearing 316A into the bores 18 and 20.

The bearing 316A illustrated in FIG. 7 is similar to the bearings 16A and 16B shown in FIGS. 1-3, thus like elements are given like element numbers preceded by the numeral 3. A spherical bearing 316A includes an outer member 352 and an inner member or split ball assembly 350 that is radially split into an inner member first section or a first split ball portion 350A, and an inner member second section or a second split ball portion 350B. The first split ball portion 350A defines a first axially outward separation face 350C and a first axially inward separation face 350D. The second split ball portion 350B defines a second axially outward separation face 350E and a second axially inward separation face 350F. When assembled as the split ball assembly 350, the first axially inward separation face 350D of the first ball portion 350A frictionally engages the second axially inward separation face 350F of the second ball portion 350B. While the split ball assembly 350 is shown and described as having two split ball portions 350A and 350B, the present invention is not limited in this regard as the split ball assembly 350 may comprise more than two portions without departing from the broader aspects of the invention.

A low friction liner 364 includes a bonding surface 380 that is secured to an interior surface 362 of the outer member 352. While the low friction liner 364 is shown and described as being secured to the interior surface 362 of the outer member 352, the present invention is not limited in this regard as a first section of the low friction liner 364 can define a bonding surface that is secured to first split ball portion 350A, and a second section of the low friction liner 364 can define a bonding surface that is secured to second split ball portion 350B. Radially splitting the spherical bearing 316A into the first split ball portion 350A and the second split ball portion 350B facilitates installation of the bearing 316A into the bores 18 and 20.

The bearing 416A illustrated in FIG. 7 is similar to the bearings 16A and 16B shown in FIGS. 1-3, thus like elements are given like element numbers preceded by the numeral 4. A spherical bearing 416A includes an inner member 450 (not shown) and an outer member 452 that is axially split into an outer member first section 452A and an outer member second section 452B. While the outer member 452 is shown and described as having two outer member sections 452A and 452B, the present invention is not limited in this regard as the outer member 452 may comprise more than two portions without departing from the broader aspects of the invention. A first low friction liner (not shown) includes a bonding surface that is secured to a first interior surface of the outer member first section 452A; and a second low friction liner (not shown) includes a bonding surface that is secured to a second interior surface of the outer member second section 452B. Axially splitting the spherical bearing 416A into the outer member first section 452A and the outer member second section 452B facilitates installation of the bearing 416A into the bores 18 and 20.

Figure 9:
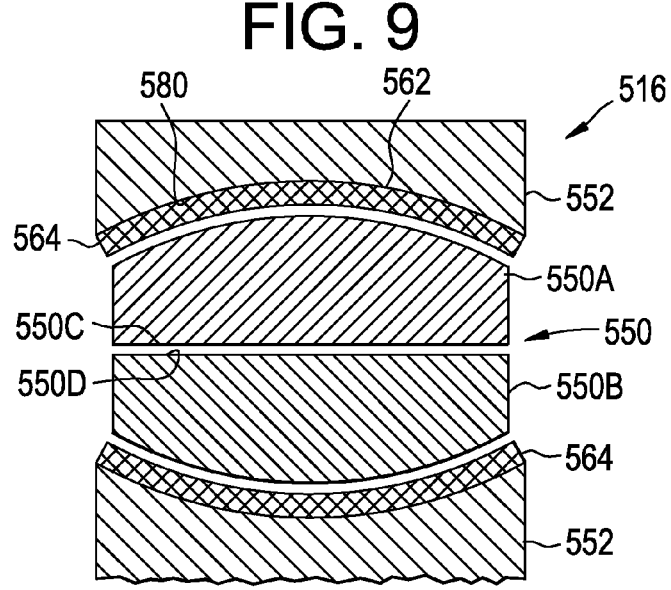
FIG. 9 is an enlarged cross sectional view of a portion of a spherical bearing having an axially split inner member.

The bearing 516A illustrated in FIG. 9 is similar to the bearings 16A and 16B shown in FIGS. 1-3, thus like elements are given like element numbers preceded by the numeral 5. A spherical bearing 516A includes an outer member 552 and an inner member or split ball assembly 550 that is axially split into an inner member first section or a first split ball portion 550A, and an inner member second section or a second split ball portion 550B. The first split ball portion 550A defines a first radially inward separation face 550C and the second split ball portion 550B defines a second radially inward separation face 550D. When assembled as the split ball assembly 550, the first radially inward separation face 550C of the first ball portion 550A frictionally engages the second radially inward separation face 550D of the second ball portion 550B. While the split ball assembly 550 is shown and described as having two split ball portions 550A and 550B, the present invention is not limited in this regard as the split ball assembly 550 may comprise more than two portions without departing from the broader aspects of the invention.

A low friction liner 564 includes a bonding surface 580 that is secured to an interior surface 562 of the outer member 552. While the low friction liner 564 is shown and described as being secured to the interior surface 562 of the outer member 552, the present invention is not limited in this regard as a first section of the low friction liner 564 can define a bonding surface that is secured to first split ball portion 550A, and a second section of the low friction liner 564 can define a bonding surface that is secured to second split ball portion 550B. Axially splitting the spherical bearing 516A into the first split ball portion 550A and the second split ball portion 550B facilitates installation of the bearing 516A into the bores 18 and 20.

Referring back to FIG. 2, the bore 18 includes a first section 18A and a second section 18B. First section 18A defines a first inner surface 18C and a first diameter D1. Second section 18B defines a second inner surface 18D and a second diameter D2. In the illustrated embodiment, the second diameter D2 is less than the first diameter D1. A shoulder 82 is formed at a juncture between the first and second sections 18A and 18B of the bore 18. The diameter D1 of the bore 18 is about equal to an outside diameter D5 of the outer member 52. The spherical bearing 16A is disposed in the first section 18A of the bore 18, for example press fit into the bore 18, such that the exterior surface 60 of the outer member 52 engages the interior surface 18C of the bore first section 18A, and a first axial end 52F of the outer member 52 engages the shoulder 82. An opposing second axial end 52E of the outer member 52 is removably clamped into the bore first section 18A by a retaining ring 87. The retaining ring 87 is secured to the undercarriage member 12 by a plurality of fasteners 88, such as bolts or hex-head screws.

The second end 24B of the equalizer bar 24 defines a first portion 24C having a third diameter D3, and a second portion 24D having a fourth diameter D4. The second portion 24D also defines an engagement surface 24E and a distal end 24X. In the illustrated embodiment, the fourth diameter D4 is less than the third diameter D3. An abutment surface 85 is defined at a juncture of the first portion 24C and the second portion 24D of the equalizer bar 24. The equalizer bar 24 is removably secured to the inner member 52 such that the engagement surface 24E of the equalizer bar 24 engages the interior surface 54 of the inner member 50. The abutment surface 85 engages an axial first end 50E of the inner member 50. The equalizer bar 24 is removably secured to the inner member 50 by a retaining plate 89 which defines an engagement surface 89E that engages an axial second end 50F of the inner member 50. The retainer plate 89 is removably secured to the equalizer bar 24 by a plurality of fasteners 90, such as bolts or hex-head screws. The undercarriage member 12 includes an access port 91 which communicates with a cavity 92 in which the retainer plate 89 and fasteners 90 are positioned. The access port 91 and cavity 92 provide access to the retainer plate 89 and fasteners 90 for insitu coupling and uncoupling the retainer plate 89 to and from the equalizer bar 24.

Each of the undercarriage members 12 and 14 define the bore 18 therein having a first section 18A and a second section 18B. The first section 18A of each bore 18 defines an opening facing inward between the undercarriage members 12 and 14, and the spherical bearings 16A and 16B are respectively removably positioned therein. The second section 18B of each bore 18 defines the cavity 92 and the access port 91 in communication therewith for providing access to the respective spherical bearing 16A or 16B.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A suspension system for a rail car comprising:
   at least two undercarriage members;
   at least one equalizer bar removably and pivotally secured to and between the two undercarriage members;
   a spherical bearing having an outer member surrounding an inner member;
   the outer member being removably secured to one of the at least one undercarriage members, the outer member defining at least one outer member section having an arcuate interior surface;
   the inner member being removably secured to the at least one equalizer bar, the inner member defining at least one inner member section having an arcuate exterior surface;
   a low friction liner disposed on at least a portion of one of the arcuate interior surface and the arcuate exterior surface; and
   the at least two undercarriage members each defining a first bore therein having a first section and a second section, the first section opening inward between the at least two undercarriage members, the spherical bearing being removably positioned in the first section, and the second section defining a cavity and an access port in communication therewith for providing access to the spherical bearing.

2. The suspension system of claim 1, wherein the low friction liner includes polytetrafluoroethylene.

3. The suspension system of claim 1, wherein the low friction liner includes a woven material.

4. The suspension system of claim 1, wherein the low friction liner has a dynamic capacity of at least 30,000 pounds per square inch.

5. The suspension system of claim 1, the first bore first section defining a first diameter and the first bore second section defining a second diameter, the second diameter being less than the first diameter.

6. The suspension system of claim 5, the inner member defining an interior surface therein, the interior surface defining a second bore extending through the inner member, a portion of the equalizer bar extending into the second bore.

7. The suspension system of claim 6, the at least one equalizer bar defining a third diameter, a first end having the third diameter, and a second end having a fourth diameter less than the third diameter, the second end received within the inner member second bore.

8. The suspension system of claim 1, wherein the outer member defines a plurality of outer member sections, each of the plurality of outer member sections having an arcuate interior surface.

9. The suspension system of claim 1, wherein the outer member defines a radially split outer member defining at least two outer member sections having an arcuate interior surface.

10. The suspension system of claim 1, wherein the outer member defines an axially split outer member defining at least two outer member sections having an arcuate interior surface.

11. The suspension system of claim 1, wherein the inner member defines a plurality of inner member sections, each of the plurality of inner member sections having an arcuate exterior surface.

12. The suspension system of claim 1, wherein the inner member defines a radially split inner member defining at least two inner member sections having an arcuate exterior surface.

13. The suspension system of claim 1, wherein the inner member defines an axially split inner member defining at least two inner member sections having an arcuate exterior surface.

14. A suspension system for a rail car comprising:
    a first undercarriage member;
    a second undercarriage member;
    a first equalizer bar having a first end secured to a portion of the first undercarriage member, and a second end removably and pivotally secured to the second undercarriage member at a first transom joint;
    a second equalizer bar having a first end secured to a portion of the second undercarriage member, and a second end removably and pivotally secured to the first undercarriage member at a second transom joint;
    a first spherical bearing disposed in the first transom joint, the first spherical bearing having a first outer member surrounding a first inner member, the first outer member being removably secured to the second undercarriage member and defining at least one first outer member section having a first arcuate interior surface, the first inner member being removably secured to the first equalizer bar and defining at least one first inner member section having a first arcuate exterior surface;
    a second spherical bearing disposed in the second transom joint, the second spherical bearing having a second outer member surrounding a second inner member, the second outer member being removably secured to the first undercarriage member and defining at least one second outer member section having a second arcuate interior surface, the second inner member being removably secured to the second equalizer bar and defining at least one second inner member section having a second arcuate exterior surface;
    a first low friction liner disposed on at least a portion of one of the first arcuate interior surface and the first arcuate exterior surface;
    a second low friction liner disposed on at least a portion of one of the second arcuate interior surface and the first arcuate exterior surface;

the first undercarriage member defining a first bore therein having a first section and a second section, the first section opening inward between the first and second undercarriage members, the first spherical bearing being removably positioned in the first section, and the second section defining a first cavity and a first access port in communication therewith for providing access to the first spherical bearing; and the second undercarriage member defining a second bore therein having a third section and a fourth section, the third section opening inward between the first and second undercarriage members, the second spherical bearing being removably positioned in the third section, and the fourth section defining a second cavity and a second access port in communication therewith for providing access to the second spherical bearing.

15. The suspension system of claim 14, wherein the first and second low friction liners include polytetrafluoroethylene.

16. The suspension system of claim 14, wherein the first and second low friction liners include a woven material.

17. The suspension system of claim 14, wherein the first and second low friction liners have a dynamic capacity of at least 30,000 pounds per square inch.

18. The suspension system of claim 14, the first bore first section defining a first diameter and the first bore second section defining a second diameter, the second diameter being less than the first diameter.

19. The suspension system of claim 18, wherein:
the first inner member defines a first interior surface therein, the first interior surface defining a third bore extending through the first inner member, a portion of the first equalizer bar extending into the third bore; and
the second inner member defines a second interior surface therein, the second interior surface defining a fourth bore extending through the second inner member, a portion of the second equalizer bar extending into the fourth bore.

20. The suspension system of claim 19, wherein:
the first equalizer bar defines a fifth diameter, a first end having the fifth diameter, and a second end having a sixth diameter less than the fifth diameter, the second end received within the first inner member third bore; and
the second equalizer bar defines a seventh diameter, a first end having the seventh diameter, and a second end having an eight diameter less than the seventh diameter, the second end received within the second inner member fourth bore.

21. The suspension system of claim 14, wherein:
the first outer member defines a plurality of first outer member sections, each of the plurality of first outer member sections having an arcuate interior surface; and
the second outer member defines a plurality of second outer member sections, each of the plurality of second outer member sections having an arcuate interior surface.

22. The suspension system of claim 14, wherein:
the first outer member defines a first radially split outer member defining at least two first outer member sections having an arcuate interior surface; and
the second outer member defines a second radially split outer member defining at least two second outer member sections having an arcuate interior surface.

23. The suspension system of claim 14, wherein:
the first outer member defines a first axially split outer member defining at least two first outer member sections having an arcuate interior surface; and
the second outer member defines a second axially split outer member defining at least two second outer member sections having an arcuate interior surface.

24. The suspension system of claim 14, wherein:
the first inner member defines a plurality of first inner member sections, each of the plurality of first inner member sections having an arcuate exterior surface; and
the second inner member defines a plurality of second inner member sections, each of the plurality of second inner member sections having an arcuate exterior surface.

25. The suspension system of claim 14, wherein:
the first inner member defines a radially split first inner member defining at least two first inner member sections having an arcuate exterior surface; and
the second inner member defines a radially split second inner member defining at least two second inner member sections having an arcuate exterior surface.

26. The suspension system of claim 14, wherein:
the first inner member defines an axially split first inner member defining at least two first inner member sections having an arcuate exterior surface; and
the second inner member defines an axially split second inner member defining at least two second inner member sections having an arcuate exterior surface.

* * * * *